June 2, 1959 R. K-F SCAL ET AL 2,889,493
MINIATURE RADAR ASSEMBLY
Filed April 30, 1954 2 Sheets-Sheet 1

INVENTOR
ROBERT K-F SCAL
CLINTON O. LINDSETH
BY
ATTORNEYS

June 2, 1959  R. K-F SCAL ET AL  2,889,493
MINIATURE RADAR ASSEMBLY
Filed April 30, 1954  2 Sheets-Sheet 2

INVENTORS
ROBERT K-F SCAL
CLINTON O. LINDSETH
BY *R. J. Tompkins*
ATTORNEY

United States Patent Office 2,889,493
Patented June 2, 1959

2,889,493

MINIATURE RADAR ASSEMBLY

Robert K-F Scal, Washington, D.C., and Clinton O. Lindseth, Arlington, Va., assignors to the United States of America as represented by the Secretary of the Navy Application April 30, 1954, Serial No. 426,947

7 Claims. (Cl. 317—101)

The invention described herein may be manufactured and used by or for the Government of the United States of America for governmental purposes without the payment of any royalties thereon or therefor.

The present invention relates to a miniature radar assembly and more particularly to a miniature radar assembly in which the various components are made up into demountable sub-assemblies that are readily removable from the radar chassis.

The use of miniature electronic elements, such as tubes, resistors, capacitors, etc., has facilitated the manufacture of very compact radar systems and has effected appreciable reductions in both weight and space requirements of the systems. However, since the elements of the radar systems thus manufactured are positioned in such close relation, maintenance and repair of the systems has become complex and time consuming. The necessity of ready accessibility of all portions of the systems for quick repair or replacement has prevented assembly of the elements of the systems into minimum size packages when using the usual plugs or soldered connections. The present invention permits assembly of the various elements of the systems within a minimum volume and at the same time increases the ease and rapidity of maintenance of the systems by combining the elements into readily replaceable components and subassemblies which are interconnected by sliding contacts.

An object of the present invention is the provision of a miniature radar assembly made up of a plurality of readily replaceable sub-assemblies.

Another object is the provision of a miniature radar assembly made up of a plurality of readily removable sub-assemblies, each of which is composed of several separable components slidably received within the sub-assembly.

A further object is the provision of a miniature radar assembly in which spring fingers and metallic contact strips are used to connect the components to the sub-assemblies and the sub-assemblies to the radar chassis.

An additional object is the provision of a miniature radar assembly made up of a plurality of sub-assemblies slidably received within compartments in the radar chassis and in which each sub-assembly can be slid almost completely out of its compartment without opening the circuits thereto.

Other objects and many of the attendant advantages of this invention will be readily appreciated as the same becomes better understood by reference to the following detailed description when considered in conjunction with the accompanying drawing wherein.

Figure 1:
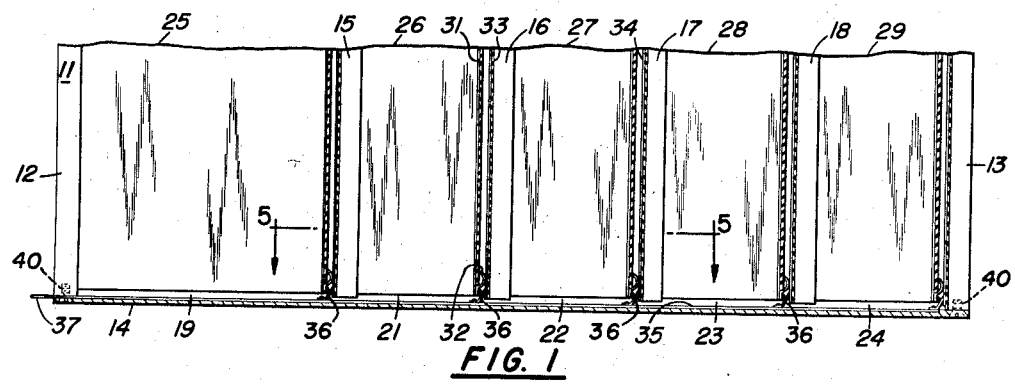
Fig. 1 is a partial side elevation view in section of a radar assembly according to the present invention.
Figure 3:
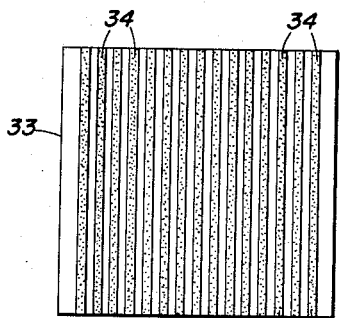
Fig. 3 is an elevation view of one of the partitions of Fig. 1 showing the metallic contact strips.
Figure 5:
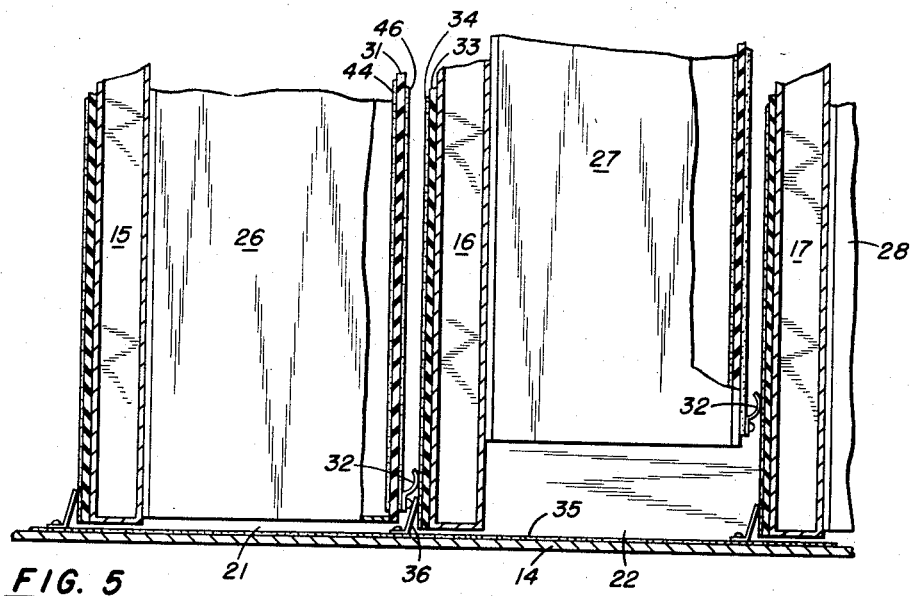
Fig. 5 is an enlarged partial view in section taken along lines 5—5 of Fig. 1.
Figure 6:
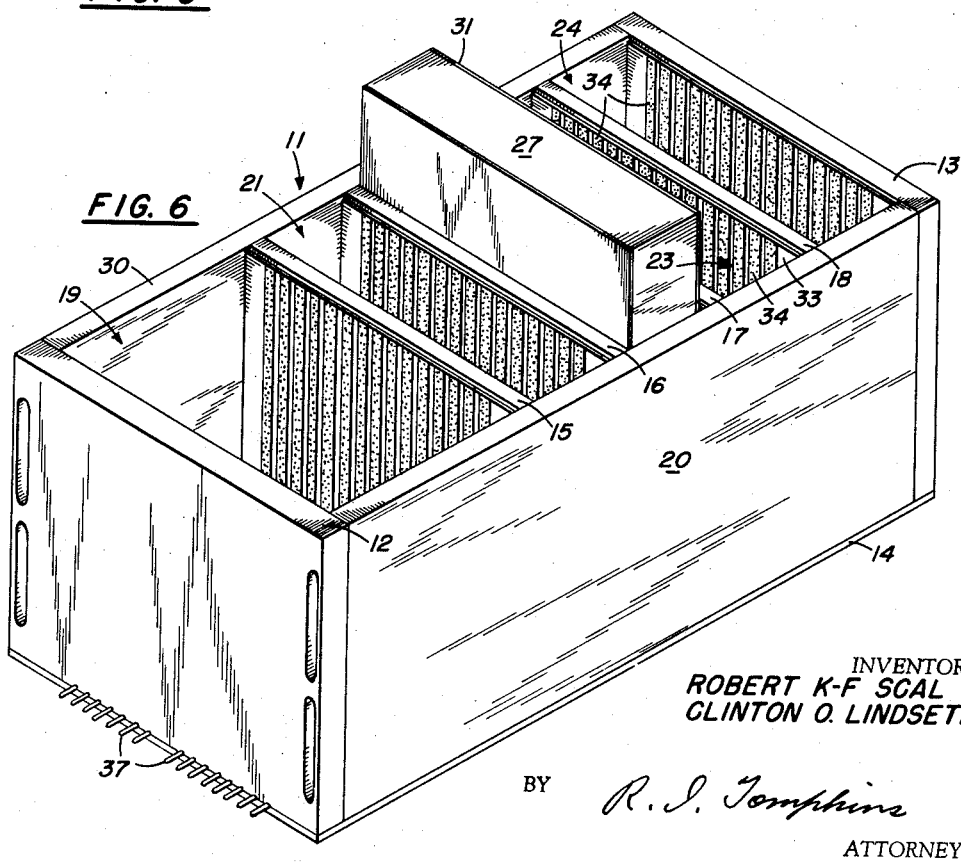
Fig. 6 is a perspective view of a radar assembly according to the present invention.

Referring more particularly to the drawing, the radar assembly illustrated in Figs. 1, 5 and 6 includes a chassis 11 having a front wall 12, rear wall 13, a base panel 14, two side walls 20 and 30, and a plurality of interior partitions 15, 16, 17 and 18 defining a plurality of compartments 19, 21, 22, 23 and 24. Base panel 14 is secured to the rest of the chassis by means of screws 40. The electronic gear of the radar assembly is made up in a plurality of sub-assemblies 25, 26, 27, 28 and 29 which are slidably received in the compartments as shown in Figs. 1, 5 and 6. The rearward surface of each of the sub-assemblies is covered by an insulating panel 31 having a row of spring finger contacts 32 mounted along its lower edge. The forward surface of the end wall and of each partition is formed of another insulating panel 33 provided with spaced metallic contact strips 34 extending between the upper and lower edges thereof, as shown in Fig. 3.

Figure 2:
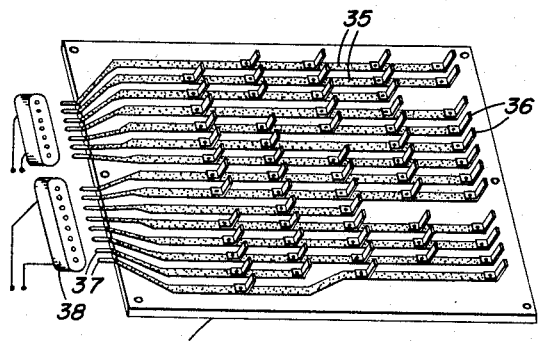
Fig. 2 is a perspective view of the base panel of Fig. 1.

Referring to Fig. 2, the base panel 14 consists of a sheet of insulating material having a plurality of metallic strips 35 on its upper surface, each of which is provided with one or more spring finger contacts 36 grouped at intervals as shown. In addition, each strip is connected to one of the prongs 37 mounted on the forward edge of the base panel which are adapted to be received within female connectors 38 that are connected to a source of electrical power outside the chassis. Unlike the strips 34 on the partitions and end wall, the strips 35 on the base panel need not be parallel nor are they necessarily of equal length for these strips form part of the circuits to the various components of the sub-assemblies, rather than being merely contacts as are strips 34. As can be seen in Figs. 1 and 5 when the base panel is attached to the chassis, the fingers 36 each make contact with one of the contact strips 34 and its corresponding spring finger 32, thus completing an electrical connection between the sub-assembly and the power source.

Figure 4:
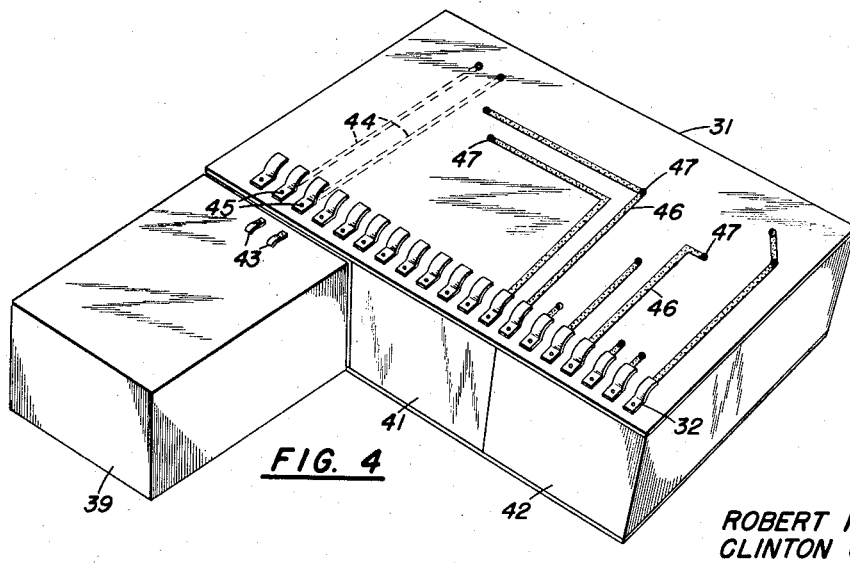
Fig. 4 is a perspective view of a sub-assembly with one of the components removed.

The typical sub-assembly, as illustrated in Fig. 4, contains a plurality of components 39, 41 and 42 which may be either fixed in position or slidably removable. In the case of a removable component, such as 39, spring finger contacts 43 on the component make sliding contact with contact strips 44 located on the lower surface of insulating panel 31, and which are electrically connected to fingers 32 by means of rivets 45. The component 39 thus slides into the sub-assembly in the same manner as the sub-assembly slides into its associated compartment, and like the sub-assembly, the component can be almost completely removed without opening the circuit thereto. The various electronic elements which make up the component 39 are connected to the spring fingers 43 and are energized only when the fingers 43 are in contact with the contact strips 44. The electronic elements of the fixed components are electrically connected to the spring fingers 32 by means of strips 46 which are like strips 35 on the base panel, in that they are part of the circuits to the elements rather than merely contact strips. To facilitate connection of the elements to the strips 46, each of the strips is provided with hollow rivets 47 into which the lead wires of the elements are inserted and then soldered in place.

In the operation of the present invention, the base plate is secured to the rest of the chassis; the various components are made up into sub-assemblies; the sub-assemblies are inserted into their respective compartments; and the system energized by pushing the plugs 38 over the prongs 37. When the sub-assemblies are seated in their compartments, the fingers 32 make direct contact with the finger 36, but when the sub-assemblies are pulled part way out of the compartments, contact between the two sets of fingers is made through the contact strips 34 (see Fig. 5). In case of failure of any of the electronic components, the affected sub-assembly can be pulled up in its compartment exposing it for inspection. If necessary, the entire sub-assembly can be removed and replaced by a similar sub-assembly or if the failure occurs in a removable component, the single component can be replaced.

The various metallic strips can be applied to their supporting panels by means of adhesive, by printing or etching, or by any similar method desired. It should be noted that the contact strips 34 and 44 are applied in straight lines as shown, but that strips 35 and 46 may be positioned as desired to connect the various electronic elements in the required circuits.

While the panels 33 generally appear as shown in Fig. 3, it is contemplated that the contact strips 34 may be interconnected or connected in circuit with various elements by means of metallic strips applied on the rear faces of the panels, and in certain instances, some or all of the contact strips 34 may be replaced by metallic strips forming parts of various circuits.

Obviously, many modifications and variations of the present invention are possible in the light of the above teachings. It is therefore to be understood, that within the scope of the appended claims, the invention may be practiced otherwise than as specifically described.

What we claim is:

1. A miniature radar assembly comprising a drawer-shaped chassis having at least one interior partition forming hollow compartments, one side of each partition being formed of an insulating panel provided with metallic contact strips; a radar sub-assembly slidably received within each compartment, each subassembly having a plurality of spring finger contacts on one side making sliding contact with the metallic contact strips; and power supply circuit means operatively connected to the contact strips.

2. A miniature radar assembly as defined in claim 1, wherein said circuit means includes an insulated bottom panel provided with longitudinal metallic strips making electrical contact with the contact strips on the partitions.

3. A miniature radar assembly comprising a drawer-shaped chassis having a plurality of interior partitions forming hollow compartments, one side of each partition being formed of an insulating panel having a plurality of spaced metallic contact strips extending from its lower edge to its upper edge; a radar sub-assembly slidably received within each compartment, each sub-assembly having a plurality of spring finger contacts along the lower edge of one side making sliding contact with the contact strips on the adjacent partition, whereby each sub-assembly can be almost completely removed from its compartment without interrupting the electrical connection between the fingers and the contact strips; and power supply circuit means connected to the contact strips.

4. A miniature radar assembly as defined in claim 3, wherein said circuit means includes an insulated bottom plate having a plurality of spaced metallic strips extending longitudinally thereon, said last mentioned strips having groups of fingers projecting therefrom at intervals making electrical contact with the contact strips on the partitions.

5. A miniature radar assembly comprising a hollow rectangular chassis sub-divided into compartments by means of interior partitions, one side of each partition being formed of an insulating panel having a plurality of spaced metallic contact strips extending between its upper and lower edges; a plurality of radar sub-assemblies each composed of a number of components, each sub-assembly being slidably received within one of said compartments; an insulating panel mounted on the side of each sub-assembly adjacent the contact strips, each insulating panel having a row of spring finger contacts along its lower edge making sliding contact with the contact strips, said components being connected to certain of the fingers by means of metallic strips on said last mentioned panel; and power supply circuit means connected to the contact strips.

6. A miniature radar assembly as defined in claim 5, wherein said circuit means includes an insulated bottom plate having a plurality of spaced metallic strips extending longitudinally thereon, said last mentioned strips having groups of fingers projecting therefrom at intervals making electrical contact with the contact strips on the partitions.

7. A miniature radar assembly comprising a hollow rectangular chassis sub-divided into compartments; a radar sub-assembly slidably received within each compartment, each sub-assembly being composed of a number of individual components at least one of which is slidably received within the sub-assembly, each slidable component making sliding contact with its sub-assembly and each sub-assembly making sliding contact with the chassis whereby current supplied to the chassis may be transmitted to the sub-assemblies and thence to their components.

References Cited in the file of this patent

UNITED STATES PATENTS

| | | |
|---|---|---|
| 1,532,935 | Patton | Apr. 7, 1925 |
| 1,844,572 | Gourley | Feb. 9, 1932 |
| 2,077,160 | Wilson | Apr. 13, 1937 |
| 2,226,745 | Schrack | Dec. 31, 1940 |
| 2,281,958 | Snarely | May 5, 1942 |
| 2,734,151 | Jacobs | Feb. 7, 1956 |